(12) United States Patent
Berto

(10) Patent No.: US 8,040,095 B2
(45) Date of Patent: Oct. 18, 2011

(54) SYNCHRONIZATION OF SEQUENTIAL PHASE SWITCHINGS IN DRIVING STATOR WINDINGS OF A MULTIPHASE SENSORLESS BRUSHLESS MOTOR AT SUB BEMF-DETECTABILITY SPEEDS

(75) Inventor: Michele Boscolo Berto, Chioggia (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 607 days.

(21) Appl. No.: 12/173,215

(22) Filed: Jul. 15, 2008

(65) Prior Publication Data
US 2009/0026991 A1    Jan. 29, 2009

(30) Foreign Application Priority Data
Jul. 25, 2007    (IT) .............................. VA2007A0064

(51) Int. Cl.
*H02P 6/00*    (2006.01)
(52) U.S. Cl. .......... 318/400.35; 318/400.34; 318/400.13
(58) Field of Classification Search ............. 318/400.35, 318/400.34, 400.13, 400.11, 721, 500, 615, 318/596, 661, 723, 439
See application file for complete search history.

(56) References Cited

U.S. PATENT DOCUMENTS

| | | | |
|---|---|---|---|
| 4,928,043 A * | 5/1990 | Plunkett | 318/400.34 |
| 6,420,847 B1 * | 7/2002 | Galbiati et al. | 318/727 |
| 6,555,977 B1 | 4/2003 | Du et al. | 318/254 |
| 6,841,903 B2 | 1/2005 | Boscolo et al. | 310/68 B |

* cited by examiner

*Primary Examiner* — Karen Masih
(74) *Attorney, Agent, or Firm* — Lisa K. Jorgenson; Allen, Dyer, Doppelt, Milbrath & Gilchrist, P.A.

(57) ABSTRACT

The method of synchronizing sequential phase switchings in driving stator windings of a multiphase sensorless brushless motor with a reconstructed information on the current angular position of a permanent magnet rotor, includes sampling on a currently non-conductive stator winding a voltage induced thereon by the resultant magnetic field produced by the drive current forced through currently conductive stator windings that inverts its sign when the rotor transitions across a plurality of significant angular positions, at which orthogonality between the resultant magnetic field and a magnetic axis of the non-excited winding verifies. The sign of the sampled voltage induced on the currently non-excited winding is compared with the sign that is expected upon transiting across the angular position of inversion by the moving rotor for the current phase drive configuration to sequentially switch to the next phase drive configuration upon verifying conformity of the sign of the sampled voltage with the expected sign.

26 Claims, 11 Drawing Sheets

SYNCHRONIZATION OF SEQUENTIAL PHASE SWITCHINGS IN DRIVING STATOR WINDINGS OF A MULTIPHASE SENSORLESS BRUSHLESS MOTOR AT SUB BEMF-DETECTABILITY SPEEDS

FIELD OF THE INVENTION

This invention relates to start-up and active braking to standstill techniques of brushless motors that do not use sensors of the angular position of the rotor. Motors of this type are largely used as spindle motors in Hard Disks, CDs, DVDs and the like.

BACKGROUND OF THE INVENTION

Sensorless brushless motors include a stator that most commonly includes three phase windings in a star configuration and a permanent magnet rotor. Through appropriate excitation sequences of the stator windings, a rotating magnetic field that causes attraction-repulsion forces on the permanent magnet of the rotor is produced. Such an electric machine is synchronous and to work correctly the stator rotating magnetic field should maintain a certain phase lag from the rotor magnetic field. For ensuring this condition it may be necessary to know at any instant the rotor angular position and to consequently drive the stator windings.

In sensorless motors, the back electromotive force (BEMF) induced on the stator windings is detected for estimating the rotor position. However, the amplitude of the BEMF is proportional to the speed of the rotor (BEMF=Ke*speed), thus it can hardly be detected if the rotor speed is too low, as at start up. To overcome this issue, it is necessary to rotate the rotor at an angular speed sufficient to generate a BEMF that may be reliably detected. Methods that address this need are commonly referred as "startup" procedures. Once a certain speed threshold is reached with the startup procedure, the excitation sequence of the stator windings is synchronized with the rotor position reconstructed from the BEMF detection and the sequential excitation of the stator windings is performed in a "BEMF-closed-loop" mode.

Numerous startup techniques are known; some carried out completely in open loop mode, other exploiting a feedback signal (closed-loop startup). In closed loop startup procedures, the feedback signal represents the position of the rotor reconstructed from indirect (sensorless) measurements and processing.

A common method of determining the position of the rotor at very low speed (or at standstill) is based on analyzing the current in the windings following the application of a voltage step (known as "inductive sensing"). The functioning principle rests on saturating the magnetic circuit causing a consequent modification of the inductance of the phase windings of the motor. From an analysis of the current response to a voltage step it is possible to determine unambiguously the position of the rotor. Once the position of the rotor is acquired, the stator windings are sequentially driven to accelerate the rotor and bring it to a speed sufficiently large to render detectable back electromotive forces (BEMF). Once the rotor reaches a speed sufficient to make the BEMF reliably detectable, the position of the rotor begins to be constantly detected and the driving of the phase windings may continue in BEMF-closed-loop mode.

These start up methods based on the analysis of currents require a direct or indirect measurement of the current flowing through the phase windings and a sufficiently accurate current sensing circuit. Typically, a sense resistor is used, but this may result in an added cost. Other methods use current sensors integrated within the power devices (sense-FET) but sensing precision (matching among distinct sense-FETs) is often insufficient.

Another method, based on saturating the magnetic circuit, that does not require direct current measurements was disclosed by the present Assignee in U.S. Pat. No. 6,841,903. According to this method, the position of the rotor is unambiguously determined by measuring the re-circulation time of the phase currents. A general drawback of methods based on saturating the magnetic circuit is the relatively long time required for the measurements. Stator currents must saturate the magnetic circuit, thus it may be necessary to force relatively large currents that in turn cause relatively long excitation times and thus expand latency times typically in the order of several hundreds microseconds, for determining the rotor position. This latency causes a phase error (when the rotor is already moving) and limits the maximum speed attainable at the end of the startup procedure making more critical the determination of the speed at which handover from the startup mode to the BEMF-closed-loop control mode should take place.

Another drawback of prior art methods based on the saturation of the magnetic circuit is sensitivity to mismatches among the motor windings, because estimation of the rotor position takes place by comparing measurements relative to different windings and results of the comparisons also depend on the match among motor windings.

Yet another known approach is based on measuring the mutual inductance through a measurement of the induced voltage by transformer effect, obtained by processing the signal sensed on the non-conductive or non-excited phase winding of the motor (the winding that is momentarily switched to a high impedance condition) when current flows through the other two phase windings of the three phase motor. According to the method described in U.S. Pat. No. 6,555,977, estimations of the rotor position are made by canceling undesired components of the induced voltage superposed to the mutual inductance component, through an appropriate filtering. This method may require a dedicated filtering stage that may increase circuit complexity and costs.

SUMMARY OF THE INVENTION

The complexities of the prior art approaches are addressed by the present invention that reduces or eliminates the problem of undesired (noise) components superposed on the induced useful signal.

The following description will discuss the sufficiency of a simplified sampling circuit to produce by comparison with an expected value of the sampled voltage, a feedback signal representative of the rotor position suitable for synchronizing sequential phase switchings in driving the stator windings of a multiphase sensorless, brushless motor. The method is based on sampling the voltage induced on a non-excited winding during the current phase of the cyclic excitation of other windings of the stator, by transformer effect that persists down to practically null speed, and it is applicable to any DC multiphase sensorless brushless motor with either star-connected or polygon-connected windings, for example.

Fundamentally, the method of synchronizing sequential phase switchings in driving stator windings of a multiphase sensorless brushless motor with a reconstructed information on the current angular position of a permanent magnet rotor, contemplates sampling on a currently non-excited stator winding a voltage induced thereon by the resultant magnetic field produced by the drive current forced through currently excited stator windings that inverts its sign when the rotor transits across a plurality of significant angular positions, at which orthogonality between the resultant magnetic field and a magnetic axis of the non-excited winding verifies.

The sign of the sampled voltage induced on the currently non-excited winding is compared with the sign that is expected upon transiting across the angular position of inversion by the moving rotor for the current phase drive configuration to sequentially switch to the next phase drive configuration upon verifying conformity of the sign of the sampled voltage with the expected sign. The sampling may be done during OFF phases or during ON phases or even during both phases of an impulsive drive signal as generally output by a PWM or PWM-like control circuitry of the motor.

Though a simple measurement of the induced voltage does not allow to unambiguously identify the position of the rotor, the information is generated every 180 electrical degrees and not every 360 electrical degrees as in prior art systems that saturate the magnetic circuit for sensing the position of the rotor. This peculiarity of the method does not jeopardize the capacity of a start up procedure of rotating the rotor in the correct direction but it may, in the worst case, cause an initial back-rotation of 90 electrical degrees. This eventuality usually does not undermine the correct functioning of the system because it would occur only at very low speed. In case back-rotation must definitely be prevented, the method may contemplate an optional identification procedure of the position of the rotor performed only once with the rotor yet at standstill, to start rotation in the desired direction.

The method may have an intrinsic ability of extracting the useful voltage induced by transformer effect from other undesired components such as BEMF that may be present beyond no longer negligible rotor speeds by purposely choosing to double sample, during ON-phases and during OFF-phases of the drive signal, and compare the current sample with the previous sample (that has opposite sign), practically canceling any "common mode" BEMF component and use the result as the useful feedback signal.

In general, the method may make less critical and practically automatic handovers from the start-up mode to the BEMF-closed loop run mode and such a characteristic is also present when passing from the BEMF-closed loop run mode to a closed loop mode exploiting the voltage induced by transformer effect as feedback signal, thus making the approach useful even for quickly completing deceleration to standstill of the rotor in spin-down procedures, as will be described later for an exemplary embodiment. In practice, the system is able to automatically pass from a start-up mode to the BEMF-closed loop mode upon reaching a speed such that the BEMF component of the voltage induced on a non-excited winding becomes larger than the component induced by transformer effect, and from the latter to a closed loop active braking mode upon reaching a sub-BEMF detectability speed during spin-downs, because switching from one mode to the other is "transparent" for the drive configuration sequencer circuitry.

DETAILED DESCRIPTION OF THE PREFERRED EMBODIMENTS

Figure 1A:
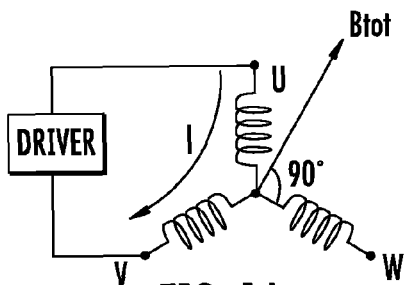
FIG. 1A is a schematic diagram illustrating a three-phase sensorless brushless motor in the excitation phase of the U V phase windings and the resulting magnetic field Btot.
Figure 1B:
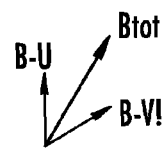
FIG. 1B is a vector diagram illustrating the magnetic field Btot as a vector sum of B-U and B-V!.
Figure 1C:
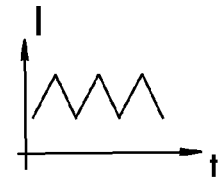
FIG. 1C is a timing diagram illustrating the variable current waveform through the windings U and V.

Working Principles of the Invention Exemplified for the Case of a Star-Connected Three-Phase Motor FIG. 1A depicts a generic three-phase motor with star-connected phase windings with a cyclically varying driving current, a typical waveform of which is shown in FIG. 1C, being forced through the phase windings UV by a control drive voltage pulse signal output by the block "DRIVER". The current flowing through an inductor generates a magnetic field H proportional to the amplitude of the current itself and the resulting magnetic field vector B is determined by the following relation:

$$B=\mu \cdot H$$

wherein μ is the magnetic permeability and depends on the material (medium) traversed by the magnetic field and H is the magnetic field strength in the vacuum.

In the example of FIG. 1A, the current enters through the phase winding tap U and exits from the phase winding tap V, thus the resulting stator magnetic field Btot would ideally have the indicated direction and sign as depicted in FIG. 1B if the medium in the rotor space has uniform and constant permeability. In particular, the vector B-U represents the magnetic field generated by the current entering the phase tap U, and the vector B-V! represents the magnetic field generated by the current exiting the phase tap V. The modulus of each of the vectors B-U and B-V! depends on the magnetic permeability of the traversed medium.

The magnetic flux Φ of a magnetic field B through a conductive loop is:

$$\phi = B \cdot S$$

wherein S is the area of the loop through which magnetic flux lines pass. Magnetic flux variations induce voltages (E) according to Faraday's law at the terminals of the conductive loop, that is:

$$E = \Delta \phi / \Delta t$$

The current forced through the windings by the circuit DRIVER is periodic and so is the absolute value of the stator magnetic field B that would thus theoretically be capable of inducing a voltage on a winding (Faraday's law) by a transformer effect.

In the vectorial representation of FIG. 1B, the absolute values (moduli) of the two vectors B-U and B-V! would remain practically identical because, through the windings U and V flows the same current, if magnetic permeability of the medium traversed by the magnetic flux lines remains uniform. If so, the direction of the resultant stator magnetic field Btot would remain orthogonal to the magnetic axis of the third (non-conductive or non-conductive) phase winding W of the stator, magnetic flux concatenation with the winding W would consequently be practically null and therefore the variations of the modulus of the resultant stator magnetic field Btot during any phase of excitation of two of the windings would not generate by transformer effect any induced voltage on the third (unexcited) winding.

Such a condition of perfect orthogonality between the stator magnetic field and the non-conductive winding(s) no longer exists if there is an element capable of locally modifying magnetic permeability in the rotor space traversed by the magnetic flux. Indeed, it has been found that the magnetic permeability in the space is influenced by the angular position of a permanent magnet rotor such to induce, by transformer effect, a detectable voltage on a non-conductive winding except at well defined angular positions of a permanent magnet rotor as normally realized in a multiphase sensorless brushless motor.

Figure 2:
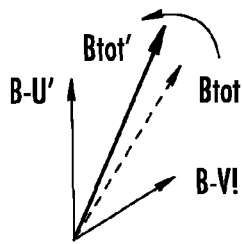
FIG. 2 is a vector diagram illustrating different absolute values of the component magnetic fields due to spatial disuniformities of the magnetic permeability and of the resultant stator magnetic field.

FIG. 2 depicts an exemplary case in which the magnetic permeability pertaining to the path of the flux lines of the magnetic field generated by the phase winding U has become greater that that pertaining to the path of the flux lines of the magnetic field generated by the other phase winding V because the rotor is in a certain position thus causing a magnetic field component B-U' stronger than that the magnetic field component B-V! produced by the other phase winding.

The so provoked difference between absolute values of the two component fields B-U' and B-V! not only causes a variation of the absolute value of the resultant stator magnetic field Btot' but also a phase shift from its would be orthogonal orientation to the magnetic axis of the non-conductive winding should the medium permeability have been uniform, indicated by the phantom vector Btot. Not being the resultant magnetic field orthogonal to the magnetic axis of the non-conductive winding (W), a no longer null magnetic flux concatenates with the winding W. Therefore, a current flowing through the phase windings U and V will be able to induce by transformer effect a voltage on the phase winding W whenever the rotor renders unequal the magnetic permeability of the medium for the respective magnetic fields generated by the two windings crossed by the same drive current.

According to an embodiment, the induced voltage on a non-conductive (that is in high impedance state or tri-stated) phase winding, properly sampled, is used for determining the rotor position and thus for synchronizing the phase switchings in sequentially driving the stator windings in respective phase configurations to accelerate (or decelerate) the rotor in the desired direction, in a closed loop mode.

Figure 3A:
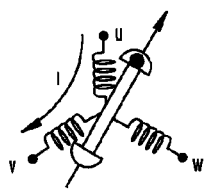
FIGS. 3A, 3B, 3C, 3D are schematic diagrams illustrating four significant positions of the rotor body having a certain magnetic permeability different from that of any associated material within the rotor space, at which the rotor body position affects the spatial permeability equally for both fields produced by the drive current flowing through the two excited phase windings UV.
Figure 3B:
Figure 3C:
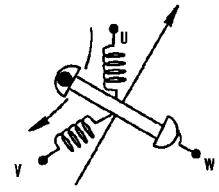
Figure 3D:
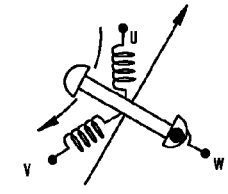
Figure 4:
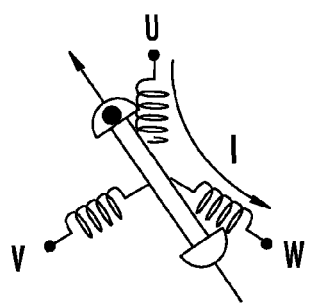
FIG. 4 is a diagram and time-graph of the voltage induced on the non-conducting (unexcited) phase winding V with the rotor out-of-phase by 0 electrical degrees from the direction of the stator magnetic field, while commonly implementing the OFF phases of the drive signal by momentarily switching on the opposite "diagonal" (WU) of the drive 'diagonal' (UW) of the ON phases.
Figure 4:
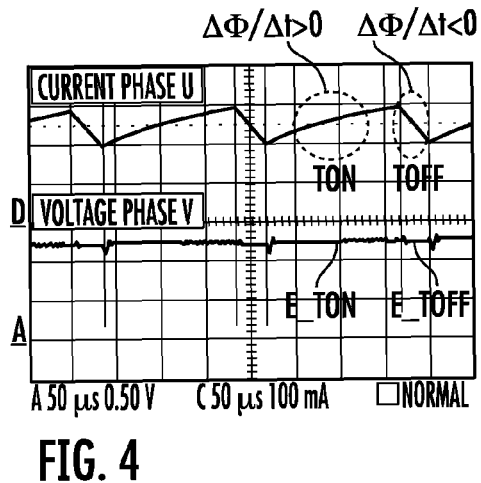

The series of Figures from 3A to 3D show four significant angular positions across which a moving rotor eventually and sequentially transits, namely: aligned with the statoric magnetic field in opposite directions (FIGS. 3A and 3B) and orthogonal to the stator magnetic field in opposite directions (FIGS. 3C and 3D). At these transition positions, the magnetic permeability "seen" by the excited phase windings U and V is momentarily identical. As a consequence, the resultant stator magnetic field becomes orthogonal to the magnetic axis of the non-conductive phase winding W and therefore the voltage is induced on it becomes null before inverting its sign in moving the permanent magnet rotor past any of the four significant angular positions. In fact, in every other position from those depicted in FIGS. 3A, 3B, 3C and 3D, the magnetic permeability seen by the phase windings U and V is different and a non-null resultant stator magnetic flux concatenates with the phase winding W.

Figures from 4 to 10 show the induced voltage that can be sampled during the TON interval of the drive signal (E_ton) or during the TOFF interval of the drive signal (E_toff), on the non-conductive phase winding, in seven different rotor positions spaced by 30 electrical degrees, respectively out-of-phase by 0, 30, 60, 90, 120, 150, 180 electrical degrees from the direction of the resultant stator magnetic field Btot. The induced voltages for the remaining positions not shown in the figure, namely of 210, 240, 270, 300, 330 electrical degrees, are obtained by symmetrically replicating the depicted waveforms.

The voltage sensed on the phase winding tap V depicted in FIGS. 4 to 10 is referenced to the common ground potential (GND). In the example shown in the FIGS. 4 to 10 the ON phases (lasting for a TON interval) and the OFF phases (lasting for a TOFF interval) of the pulse drive signal are determined by a PWM control system wherein the OFF phase is implemented by inverting the ON phase direction of the driving current in the two windings. In other words, the ON phase is obtained by connecting the phase tap U to the supply voltage (+VCC) and the phase tap W to ground (GND) for a time interval TON; and the OFF phase is obtained by connecting the phase tap U to ground (GND) and the phase tap W to the supply voltage (+VCC) for a time internal TOFF. The same result may be obtained by placing the drive stage in a high impedance state during the OFF phase. In this case, the free-wheeling diodes turn on the appropriate reverse "diagonal" of the full bridge stage. Anyway, this is not the only way to produce the TOFF phases. Alternatively, they may be implemented for example by forcing the taps to a different voltage (i.e. GND).

It must be remarked that the voltage induced in the non-conductive (unexcited) phase winding becomes null (E_ton=E_toff) at positions out-of-phase by 0, 90, 180 and 270 degrees, as already explained above in connection with the schemes of FIGS. 3A-3D.

Figure 11A:
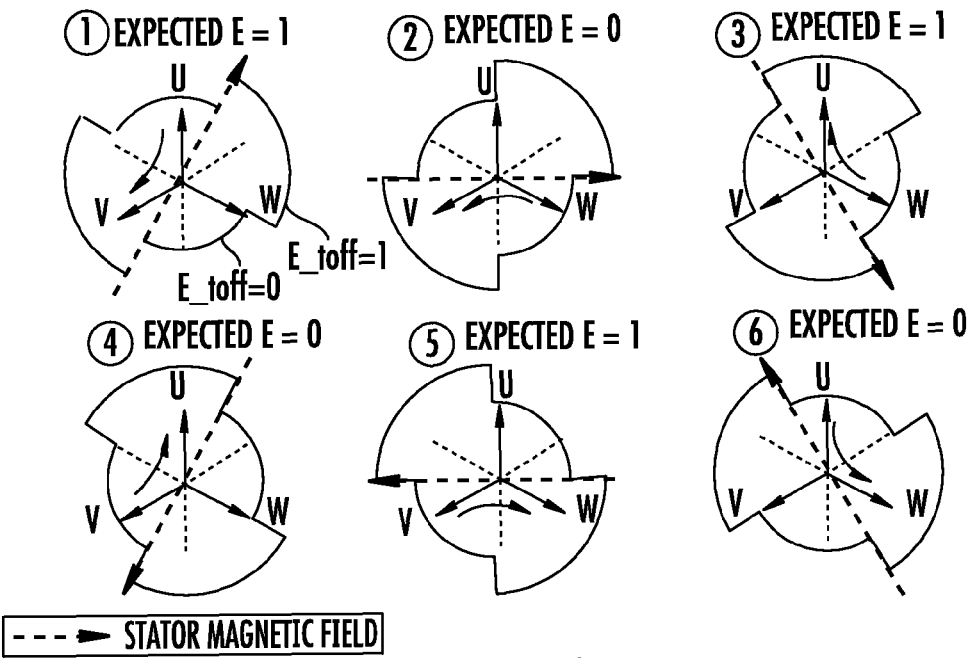
FIG. 11A is a diagram illustrating the expected sign at inversion of the voltage induced on the non-conducting (unexcited) winding by sampling it during the TOFF phase of the drive signal for all six phase excitation configurations UV, WV, WU, VU, VW, UW.
Figure 11B:
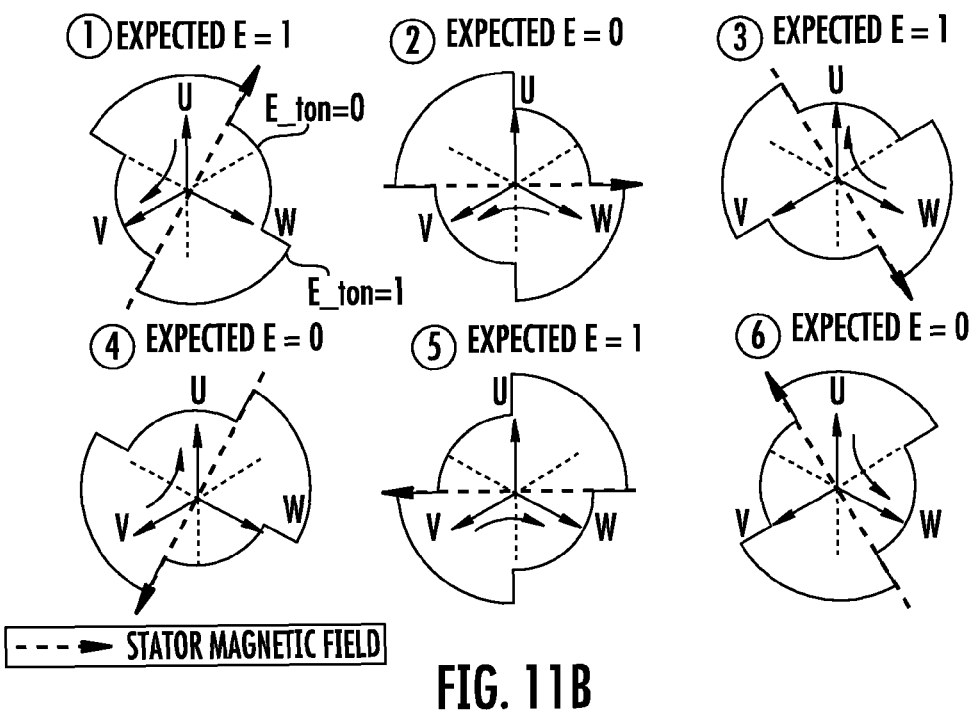
FIG. 11B is a diagram illustrating the expected sign at inversion of the voltage induced on the non-conducting (unexcited) winding by sampling it during the TON phase of the drive signal for all six phase excitation configurations UV, WV, WU, VU, VW, UW.

FIG. 11A shows schemes for which the expected sign at inversion of the induced voltage sampled during TOFF intervals (E_toff) on the non-conductive phase winding, for the six cyclically implemented different phase drive configurations, namely: VU, VW, UW, UV, WV, WU, depending from the reconstructed rotor position are shown. Of course, the voltage that is induced during TON intervals will be of opposite sign, as shown in FIG. 11B. However, the sequence of expected signs at transition points of the travel of the rotor remains unchanged for TON or TOFF sampling (maintaining coherence with the expected signs of the BEMF during rev-ups), and it is inverted if the direction of acceleration that is desired is inverted (e.g. for actively braking the rotor during spin-downs).

The "sign" of the sampled signal is determined by comparing the voltage at a phase tap (sensed on the taps U or V or W) with a reference voltage, that may be the voltage of the real or reconstructed neutral-point (CT) or a fraction of the supply voltage, or the common ground potential or any other fixed voltage reference. The positive sign or polarity is assumed to be represented by a logic "1" and the negative sign or polarity by a logic "0", as it happens using a single supply comparator.

First Embodiment

Two phase windings of a three phase stator (U and W for example) are commonly driven with a periodic control voltage (typically a PWM or PWM-like drive control signal) producing a current through the inductive windings having a significant ripple. The drive current ripple will generate induced voltages "E" (by transformer effect) on the floating third phase winding. The sign of the induced voltage "E" sampled during either the TON interval or during the TOFF interval of the PWM or PWM-like control signal provides an effective feedback signal for a startup procedure.

According to the method, it is sufficient to drive the phase windings according to a first phase windings configuration with a sequence of TON and TOFF phases of the drive signal as long as the sign of the voltage induced on the non-conductive phase winding assumes the expected value (Expected E) for the first implemented configuration and when this occurs excitation is switched to the next phase windings configuration and the sign of the induced voltage is sampled on the respectively non-conductive winding. Thereafter, the new phase driving will continue as long as the sampled signal on the non-conductive phase winding assumes the expected value (Expected E) for the current configuration and when this occurs excitation will be switched to the next sequential phase windings configuration and so on.

Figure 12:
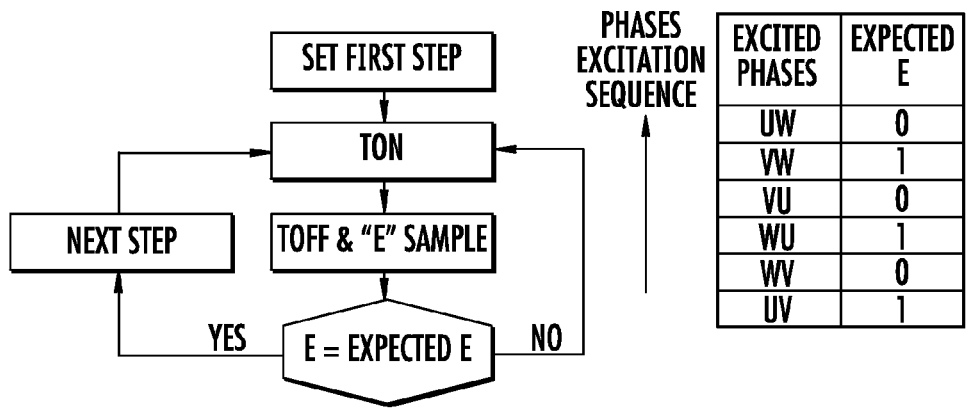
FIG. 12 is a flow-chart of a start up procedure according to a first embodiment of the method of the present invention wherein the induced voltage "E" is sampled during TOFF phases of the drive signal.

FIG. 12 is an exemplary flow-chart wherein the induced voltage "E" is sampled during TOFF phases of the drive signal and the sequence of excitation of the phase windings with the related expected values ("Expected E") are indicated in the associated table. Of course, the excitation sequence of the phase windings and the expected values ("Expected E") for the induced voltage on the non-conductive winding will differ from those depicted in the associated table depending from the direction of acceleration.

Figure 5:
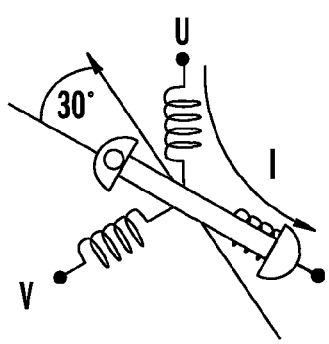
FIG. 5 is a diagram and time-graph of the voltage induced on the non-conducting (unexcited) phase winding V with the rotor out-of-phase by 30 electrical degrees from the direction of the statoric magnetic field, while commonly implementing the OFF phases of the drive signal by momentarily switching on the opposite "diagonal" (WU) of the drive "diagonal" (UW) of the ON phases.
Figure 5:
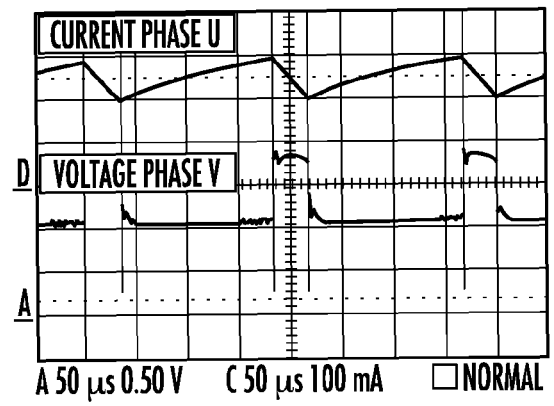
Figure 6:
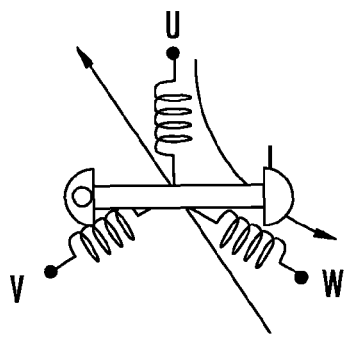
FIG. 6 is a diagram and time-graph of the voltage induced on the non-conducting (unexcited) phase winding V with the rotor out-of-phase by 60 electrical degrees from the direction of the stator magnetic field, while commonly implementing the OFF phases of the drive signal by momentarily switching on the opposite "diagonal" (WU) of the dive "diagonal" (UW) of the ON phases.
Figure 6:
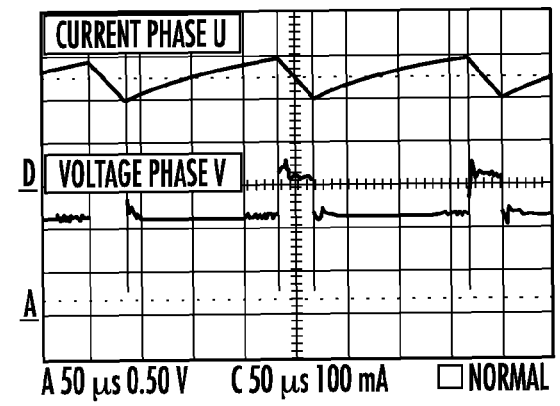
Figure 7:
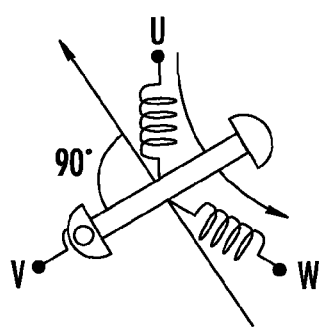
FIG. 7 is a diagram and time-graph of the voltage induced on the non-conducting (unexcited) phase winding V with the rotor out-of-phase by 90 electrical degrees from the direction of the statoric magnetic field, while commonly implementing the OFF phases of the drive signal by momentarily switching on the opposite "diagonal" (WU) of the drive "diagonal" (UW) of the ON phases.
Figure 7:
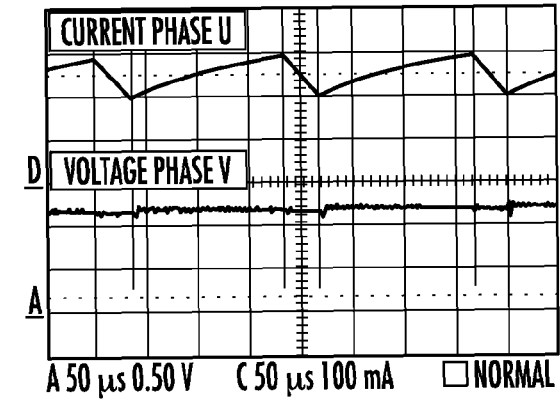
Figure 8:
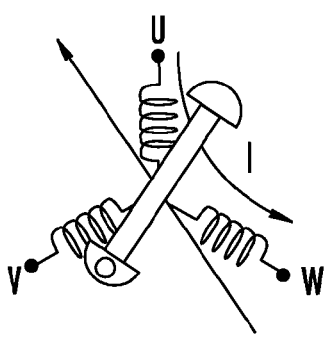
FIG. 8 is a diagram and time-graph of the voltage induced on the non-conducting (unexcited) phase winding V with the rotor out-of-phase by 120 electrical degrees from the direction of the statoric magnetic field, while commonly implementing the OFF phases of the drive signal by momentarily switching on the opposite "diagonal" (WU) of the drive "diagonal" (UW) of the ON phases.
Figure 8:
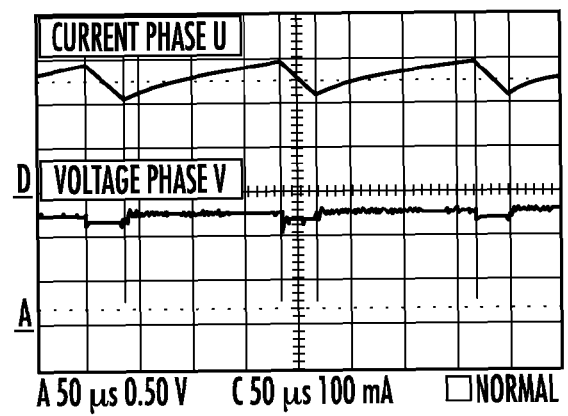
Figure 9:
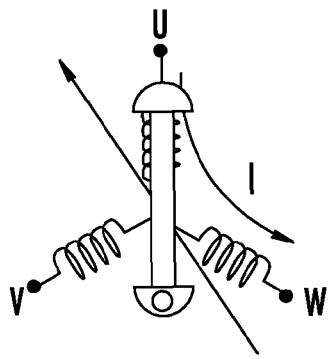
FIG. 9 is a diagram and time-graph of the voltage induced on the non-conducting (unexcited) phase winding V with the rotor out-of-phase by 150 electrical degrees from the direction of the statoric magnetic field, while commonly implementing the OFF phases of the drive signal by momentarily switching on the opposite drive "diagonal" (WU) of the drive "diagonal" (UW) of the ON phases.
Figure 9:
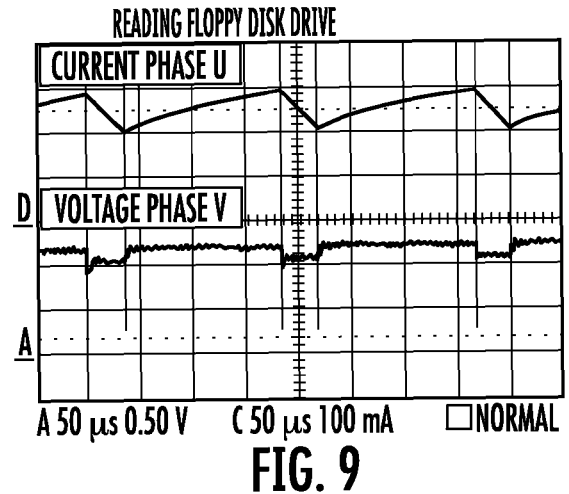
Figure 10:
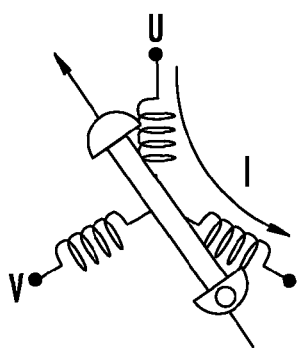
FIG. 10 is a diagram and time-graph of the voltage induced on the non-conducting (unexcited) phase winding V with the rotor out-of-phase by 180 electrical degrees from the direction of the stator magnetic field, while commonly implementing the OFF phases of the drive signal by momentarily switching on the opposite "diagonal" (WU) of the drive "diagonal" (UW) of the ON phases.
Figure 10:
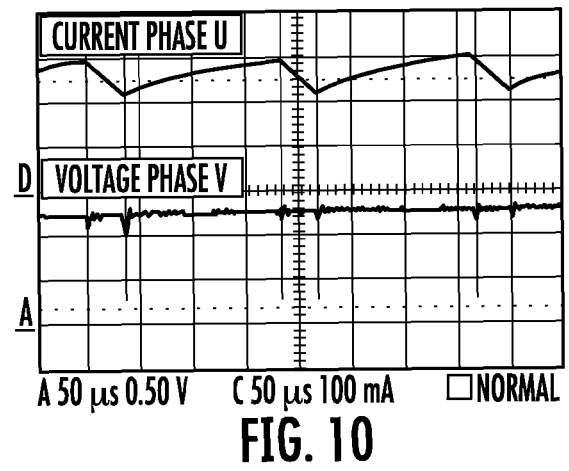

For accelerating the motor clockwise, suppose to start the sequence by driving the phase windings U and W (current entering through the U tap and exiting from the W tap) and further that the rotor is at start aligned to the magnetic axis of the phase winding W, as depicted in FIG. 5. The resulting stator magnetic field will be as depicted in FIG. 5 and out of phase by 30 electrical degrees in respect to the magnetic axis of the permanent magnet rotor. The rotor magnet will be subject to attraction/repulsion forces that accelerate it clockwise (toward alignment with the axis of the stator magnetic field orthogonal to the axis of the winding V).

The sign of the induced voltage on the non-conductive winding V sampled during TOFF phases will have the sign illustrated in FIG. 5, that is positive. The rotor, accelerated in the clockwise direction, will eventually reach and overtake the condition of alignment with the stator magnetic field and of the orthogonality with the magnetic axis of the winding V at which its sign will become negative. As soon as the induced voltage on the phase winding V assumes a negative value, the excitation to the next phase configuration of the six switches such to generate a stator magnetic field advanced clockwise by 60 electrical degrees in respect to the preceding stator magnetic field orientation of FIG. 5. This is effected by driving current through the U and V phase windings (current entering through the U tap and exiting from the V tap) and sampling the voltage induced on the non-conductive phase winding (phase W).

The sequence of the six phase configurations that is cyclically repeated is, depicted in FIG. 11A (for the assumed start from the condition depicted in FIG. 5 the first excitation phase is "6" and the second will be "1" and so forth). The rotor will be subject to attraction/repulsion forces that accelerate it in the desired direction (clockwise).

Normally, the driving of the windings during each of the six excitation phases with a succession of TON and TOFF phases of the drive signal continues in case of PWM driving) continues as long as the sign of the sampled induced voltage is found to correspond to the expected sign for the current excitation phase ("1"=positive and "0"=negative). At every switching of excitation phase the resultant stator magnetic field advances clockwise by 60 electrical degrees for the preceding orientation The sequence of six excitation phase switches commanded in a closed loop fashion at inversions of sign continues cyclically until the accelerated rotor reaches a certain speed.

This start up sequence allows to produce a torque for accelerating the rotor in the desired direction and the angular position of the rotor is constantly reconstructed for properly progressing through the sequential phase switchings of the stator windings to accelerate the rotor. Contrary to prior art methods based on the saturation of the magnetic circuit (inductive sensing), the phase windings are sequentially driven to accelerate the rotor and not for producing a stimulus for reconstructing the angular position of the rotor by analyzing the electrical response to it.

It will be now described how the start up sequence according to this first embodiment of the method of this invention is able to accelerate the rotor in the desired direction even if the rotor was initially in an unfavorable position (apart from an initial back-rotation that will be at most of 90 electrical degrees). Suppose that the rotor were initially in the opposite position from that of the previous example (that is out-phased by 180 electrical degrees in respect to its orientation in the scheme of FIG. 5) and that the excitation sequence were started in the same manner that is by first exciting the phase windings U and W (current entering through the U tap and exiting from the W tap) depicted as in the phase configuration "6" of FIG. 11A, and sampling the voltage induced on the non-conductive phase winding V during TOFF phases of the PWM drive signal. The voltage induced on the floating phase winding V will be positive and the first excitation phase sequence is continued as long as the induced voltage becomes negative (Expected E=0), as already described above. Because of its orientation at rest, the rotor will have moved counterclockwise (back-rotation) until eventually overtaking alignment to the magnetic axis of the phase winding V, position at which the induced voltage E will become negative.

Then the sequence contemplates the excitation of phase windings U and V (current entering through the U tap and exiting from the V tap) as depicted in configuration "1" of FIG. 11A to be maintained as long as the induced voltage sampled on the floating phase winding W is found to be positive (Expected E=1) However, at the time of the phase switching alignment to the axis of the winding V the induced voltage on the winding W will be positive from the instant of the phase switching.

The driving of the phase windings UV of the first configuration "1" of (FIG. 11A) will then be very short, that is for a TON interval and a TOFF interval plus an additional masking time if required (typically few hundreds of microseconds in total), thus the rotor may be considered to remain almost at the same position (practically aligned on the phase winding V) when the next phase winding configuration "2" of FIG. 11A is excited.

The voltage induced on the non-conductive phase winding U (configuration "2" of FIG. 11A) with the rotor still practically aligned to the phase winding V is positive and the driving of the phase windings WV continues until the induced voltage on the phase U becomes negative (Expected E=0). Therefore, the now prolonged driving of the phase windings WV produce a torque on the rotor in the correct clockwise direction causing it to invert its initial back rotation and to start rotating in the desired clockwise direction. From this point onwards, the sequence of phase switchings continues accelerating the rotor in the correct clockwise direction. In the above described example, the back-rotation that is initially experienced is just about 60 electrical degrees, before the rotor start to rotate in the correct direction.

The start up procedure according to this first embodiment of the method of this invention is thus capable of correctly reaching a steady-state in a completely autonomous fashion, without any prior knowledge of the rotor rest position and is useful in any application wherein an eventual initial back-rotation of 90 degrees at most is tolerable. In special applications that would not tolerate any back-rotation though limited it may be, it will be sufficient to use any appropriate known initial rotor position detection technique. For example the technique described in U.S. Pat. No. 6,841,903 may be satisfactorily used before executing the start-up procedure according to the method of this invention.

A drawback of the above described sequence of phase switchings for accelerating the rotor in the desired direction even when the rotor happens to be in an unfavorable rest position is that the mean value of the motor torque is initially decreased about 50% (shadowed zone of FIG. 13) from the full theoretical value that could be obtained from a ideal six-step commutation scheme. Another limitation when sampling the induced voltage during TOFF phases of the periodic drive signal, includes the presence of a point (angular position) of null torque (FIG. 13) that theoretically could impair the startup procedure should the rotor be initially at that point. Reduction of the average torque value would be less if the sampling of the induced voltage is carried out during TON phases.

Similarly to the above described procedure with sampling done during TOFF phases, supposing accelerating the motor clockwise and of starting the sequence by driving the phase windings UW (current entering through the U tap and exiting from the W tap) and further that the rotor is at start aligned to the magnetic axis of the phase winding W in the opposite direction of that as depicted in FIG. 5. The resultant magnetic field vector produced by the stator windings during this first phase will be oriented as depicted in the figure, out-phased at start by 30 electrical degrees from the magnetic axis of the permanent magnet rotor. In these conditions, the rotor will be subjected to attraction/repulsion forces that accelerates it in a clockwise direction (toward the stator magnetic field axis).

The induced voltage on the non-conductive phase winding V, sampled during TON phases of the drive signal, will have the opposite sign of that sensed during TOFF phases that is it will be negative. The procedure contemplates switching the sequential phase excitation when the induced voltage sign will become equal to the value "Expected_E", that in this case will be negative, as indicated for the configuration "6" of FIG. 11B. Because the Expected E=0 and the induced voltage is equal to 0 the successive step of the excitation sequence is immediately initiated.

In the successive excitation phase, windings UV are driven (current entering through the U tap and exiting from the V tap) and the situation becomes that depicted in the configuration "1" of FIG. 11B until the sampled value (E_ton) is found to be positive (Expected E=1). However, the rotor being at a transition point, immediately or after few driving pulses (i.e. after few PWM periods) the sampled value E_ton will be found to be positive forcing a new change of phase of the excitation sequence.

Then the phase windings WV will be driven (current entering through the W tap and exiting from the V tap) as depicted in the configuration "2" of FIG. 11E. The rotor will be only slightly out-of-phase past the axis of the winding W and thus the sampled induced voltage (E_ton) will be positive. Being in these conditions the "Expected E=0", the procedure confirms the driving of the phase windings WV as far as the rotor, moving clockwise, will align itself to the magnetic axis of the phase winding U. When this occurs, the sequential excitation switches again and the phase windings WU are excited (current entering through the W tap and exiting from the U tap). This drive condition is maintained as far as the rotor surpasses the alignment condition with the magnetic axis of the non-conductive phase winding V and so on.

Figure 20:
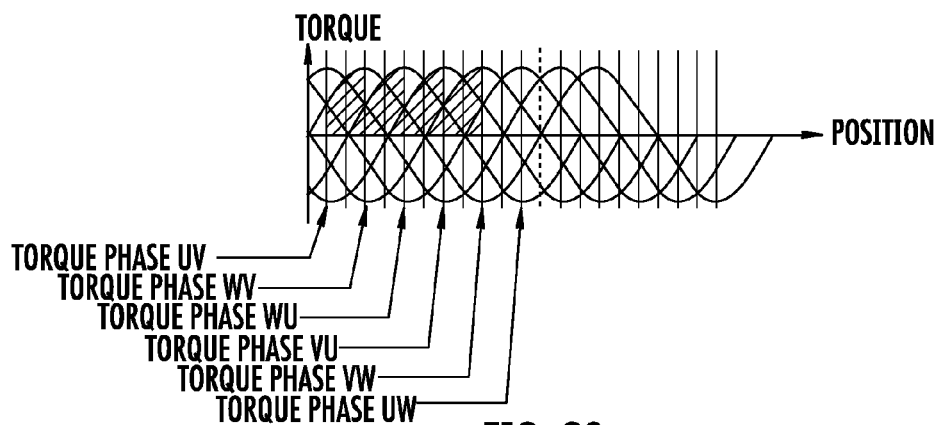
FIG. 20 is a graph depicting the value of motor torque as a function of the rotor position and of the excitation phases for a start up procedure according to a first embodiment, but sampling the induced voltage during TON phases of the drive signal.

Thus the rotor is subjected to forces that accelerate it in the desired direction (clockwise). Differently from the case in which the sampling is done during TOFF phase of the drive signal, there is a significant phase relation between stator and rotor magnetic fields and the resulting torque value, as shown by the shadowed zone of FIG. 20 does not have null points.

Similarly to what has been described in the first example, the start up procedure is capable of accelerating the rotor in the desired direction even in case of an unfavorable initial position of the rotor though a negligible initial back-rotation may take place.

Second Embodiment

Enhanced Torque

Different from the first embodiment, the driving of the currently selected phase windings according to a first configuration (Step1) is performed for a certain pre-established time Tstep1 instead of being continued as long as verifying an expected condition (E=Expected E) of inversion of the sign of the sampled enhanced voltage on the non-conductive winding. Each of the six phase driving configurations that are sequentially implemented upon detecting the expected sign of the sampled induced voltage, include a sub-sequence of cyclic phase switchings that continues until the expected sign of the sampled voltage for the particular phase is verified.

For each driving configuration, after a first interval of drive Tstep1 at least a successive configuration (Step2) of the cyclic drive sequence is excited for a pre-established time Tstep2 such to advance the angular orientation of the stator magnetic field vector by 60° degrees. For example, if the driven stator phase windings during Step1 are U and V (current entering through the U tap and exiting through the V tap) then the excitation WV (current entering through the W tap and exiting from the V tap) is successively implemented for a second interval of time Tstep2 such to generate a magnetic field advanced by 60 electrical degrees (in the desired direction for the rotor motion) in respect to that generated when driving of the phase windings UV during the first Step1. Optionally, further steps (Step3, . . . , Step-n), each advancing by 60 degrees the stator magnetic field vector from the previous step, may follow each lasting a predefined interval of time and eventually the particular arbitrary "sub-sequence" of phase switchings is repeated.

Comparison of the sampled sign of the induced voltage on the non-conductive windings may be performed before the end of the first time internal Tstep1 and repeated at every cyclic repetition of the same phase drive configuration or during Tstep2 or any other steps of the chosen sub-sequence of time limited steps. Preferably, only a second time limited step is contemplated, leading to an eventual alternate switching between the two contiguous phase drive configurations. The duration of each of the chosen number of steps may be equal or different from that of the other steps and will generally be equal to or shorter than the expected time for the rotor to move through the first 60 electrical degrees in accelerating from standstill.

These deliberate and substantially arbitrary phase switchings continue as far as the detected induced voltage assumes the expected sign for the current drive configuration of the phase windings for the configuration of the first interval of driving Tstep1. When this occurs, the driving configuration switches to the next one of the six-step drive configurations and the excitation of the new configuration for the pre-established first period of time, followed by the execution of the arbitrary phase switchings, advancing by 60 electrical degrees the stator magnetic field vector orientation, for the relative pre-established periods of time, continues until the expected sign of the sampled induced voltage for the new configuration is verified, and so forth.

Figure 13:
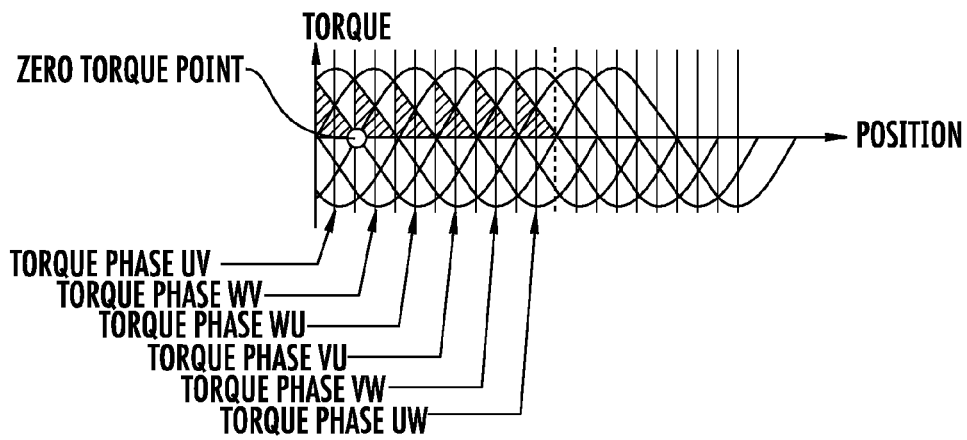
FIG. 13 is a graph depicting the motor torque value as a function of the rotor position and of the driven phase windings for a startup procedure according to a first embodiment, sampling the induced voltage during the TOFF phases of the drive signal.
Figure 14:
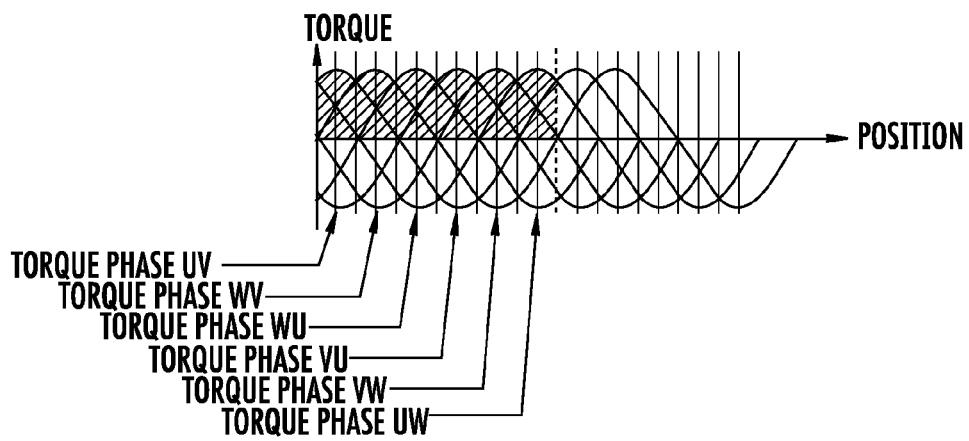
FIG. 14 is a graph depicting the increased or maximized torque that can be obtained with a start-up procedure according to an alternative embodiment of the method of this invention.

In case of arbitrary alternate switchings between two configurations Step1/Step2, if sampling is done during TOFF, the torque profile generated by the step1 will be as shown in FIG. 13. While the torque profile generated by the step2 will be as shown in FIG. 14 (hatched area) that is improved or maximized and free of "dead spots". The resultant torque will be a weighted average of the two profiles that will depend from the ratio Tstep2/Tstep1. Therefore, if Tstep2 is much longer than Tstep1, the resultant torque will approach the profile of FIG. 14. For this reason, if sampling is done during TOFF, the duration Tstep2 of the second step that is preferably made longer than Tstep1. Of course, the sampling may alternatively be done during TON phases.

Figure 15:
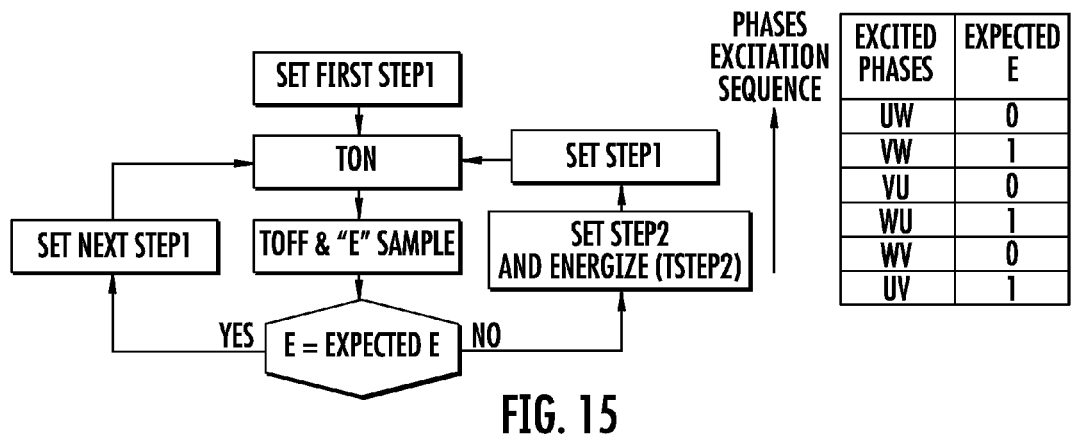
FIG. 15 is a flow-chart of an alternative start up procedure according to a second embodiment of the method of this invention wherein the induced voltage "E" is sampled during TOFF phases of the drive signal.

FIG. 15 depicts an exemplary flow chart in which the induced voltage "E" is sampled during TOFF phases of the drive signal and wherein only a single arbitrary second phase driving step lasting at pre-established period of time, Tstep2 is done after the first drive step Step1 lasting a pre-established period of time Tstep1. In practice each of the six phase driving configuration includes a sub-sequence of only another phase driving step, the first step and the second step practically alternate until the expected sign of the sampled induced voltage for the comparison of the first step is verified.

Other alternatives of the illustrated flow-chart may be implemented, for obtaining the same result. For example, it is possible to execute the second phase driving step Step2, lasting Tstep2 and then compare the sign instead of comparing it before ending Step1 and then the flow chart and excitation sequence of FIG. 15 should be considered only as examples of several alternatives. In this second embodiment a maximum attainable speed has a lower bound because the frequency of sampling and comparing the voltage induced on the non-conductive winding may be limited by the pre-established duration of the various steps of excitation of the contemplated sub-sequence of phase switchings.

Figure 16:
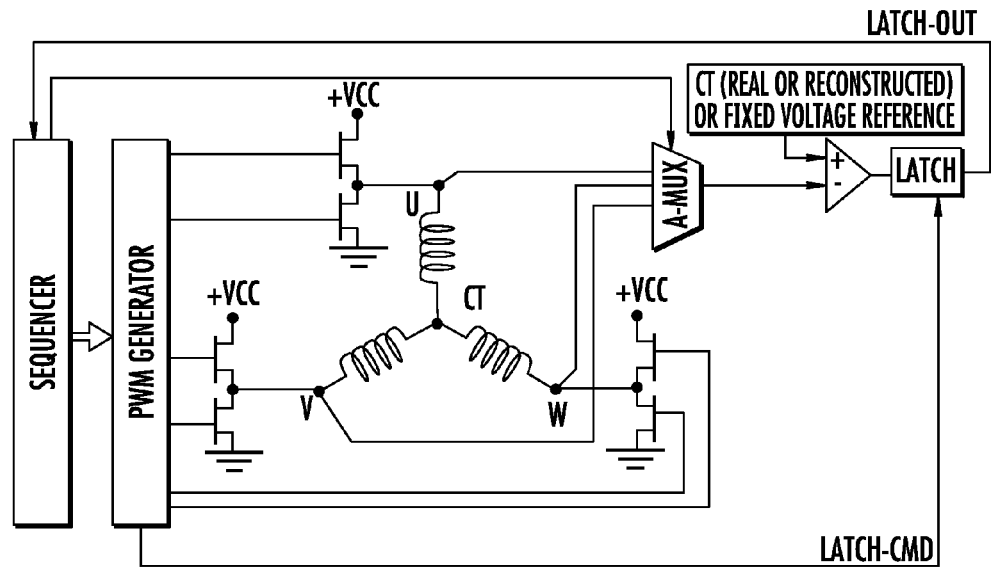
FIG. 16 is a schematic diagram illustrating a circuit suitable for an hardware implementation of both alternative embodiments of FIGS. 12 and 15.
Figure 17:
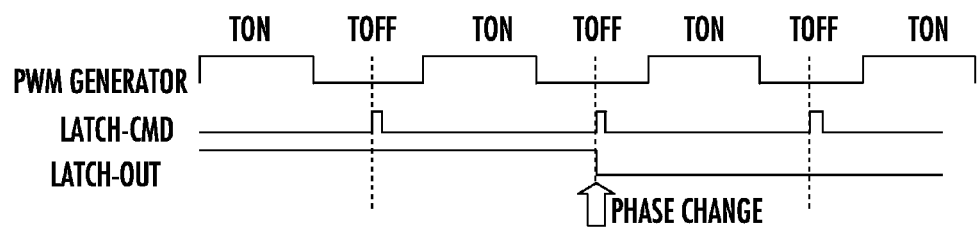
FIG. 17 is a signal diagram showing the circuit signals relative to the implementing circuit of FIG. 16 executing the procedure of FIG. 12.

An example of a circuit adapted to implement either the start-up procedure according to the first or the second embodiment is shown in FIG. 16. FIG. 17 depicts the significant signals in a particular functioning condition (a phase change) relative to the implementation of the start up procedure according to the first embodiment.

It is noted that neither the first nor the second embodiment contemplates any cancellation of the BEMF signal that will superpose itself to the induced voltage "E" when the rotor has a non-null speed, contrary to what happens in the prior art systems. This, as will be better illustrated hereinafter, does not degrade the reliability of the method. It is even possible to nullify any disturbing effect of the BEMF by practicing approach according to alternative third and fourth embodiments, as will be described hereinafter. The method here below described doesn't include any analog filtering as in the prior art methods.

Third Embodiment

Cancellation of any Superimposed BEMF

According to an intrinsic advantage of the method, the processing of the signal sensed at the tap of the phase winding that is non-conductive does not require any burdensome filtering as in the prior art systems, rather the method may simply compare samplings done both during TOFF and during TON phase of the drive signal for extracting the induced voltage unaffected by any BEMF. The effects of the BEMF that become of relevance at relatively high speed are substantially nullified making possible to detect the sign of the induced voltage "E" on the non-conductive phase winding by transformer effect even at high speeds. According to this embodiment, the induced voltage E is double sampled during TON and during TOFF phases of the drive signal and the two successive samples are compared. Of course, this requires the use of a "Sample&Hold" circuit. The manner of sampling during the TOFF phase must be chosen correctly depending on the method used for sensing the induced voltage "E".

Figure 18A:
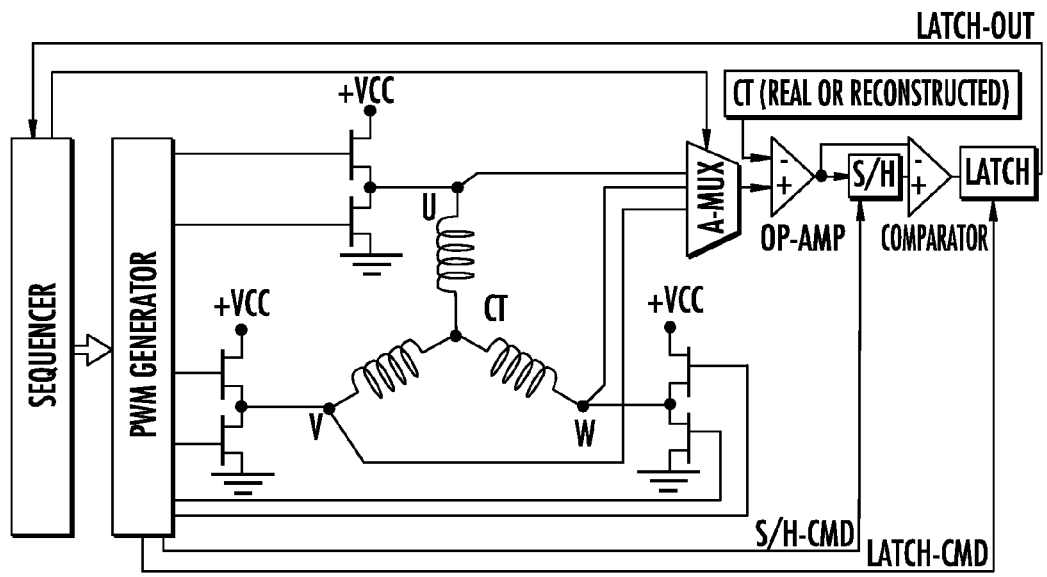
FIG. 18A is a schematic diagram illustrating a circuit suitable for embodiments in which the sampled induced voltage is sensed between a winding tap and the neutral-point (real or reconstructed) of the star configured stator windings.

FIG. 18A depicts the case in which the induced voltage E is sensed between the phase winding tap and the star neutral point CT (real or reconstructed). In this case, it is possible to implement the OFF phase of the drive signal by shorting the windings (e.g. by coupling their taps to the same potential, typically VCC or GND) or by inverting the drive diagonal of the TON configuration or by forcing the driver stage to high impedance state. In other words, using an operational amplifier connected between a phase winding tap and the neutral point CT (real or reconstructed) reconstruction of the sole differential voltage on the nodes of the winding, independently from its common mode value (bias), is achieved.

Depending on the sequence used for controlling the "Sample&Hold" circuit and the "slatch" circuit, an average motor torque similar to that generated in the first embodiment, with sampling carried out during TON or during TOFF phases, may be produced.

Figure 18B:
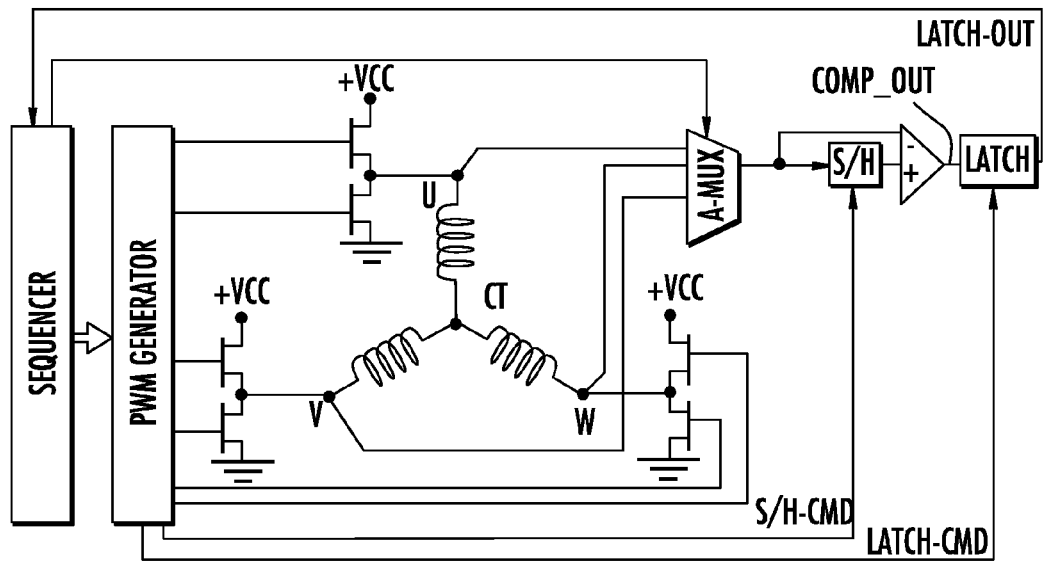
FIG. 18B is a schematic diagram illustrating a circuit suitable for embodiments in which the sampled induced voltage is sensed between a winding tap and the a common ground node.

FIG. 18B illustrates an alternative circuit that can be used in which the induced voltage is determined between a phase winding tap and GND and thus not on the winding alone. In this case, the circuit is less expensive because an operational amplifier connected upstream of the comparator and the "Sample&Hold" circuit is no longer required. In this case it may be necessary to implement the OFF phase of the drive signal by forcing the windings being excited by inverting the diagonal from that of the TON configuration or by forcing the driver stage to high impedance state (the opposite drive diagonal would then turn on automatically due to the free-wheeling diodes).

In other words, in case of the alternative circuit of FIG. 18B, the OFF phase may not be implemented by coupling both phase taps to the same potential (GND or VCC) because the common mode voltage would be different (GND or VCC, respectively) from that of the ON phase (that is always equal to VCC/2). Identical bias voltages during the ON phases and during the OFF phases (in both cases equal to VCC/2) are ensured by implementing the OFF phase as described above.

In case of the circuit of FIG. 18B, the sampled voltage is the sum of three addends: the BEMF voltage, the induced voltage "E" and the bias or common mode voltage equal to VCC/2:

$$V\_Ton = BEMFon + E\_ton + VCC/2$$

$$V\_Toff = BEMFoff + E\_toff + VCC/2$$

wherein V_ton is the voltage sampled during the ON phases, V_toff is the resultant voltage sampled during the OFF phase, BEMFon is the BEMF during the ON phases, BEMFoff is the BEMF during the OFF phase. Since the period of the drive signal TON+TOFF is small it is possible to consider, in such a time interval, BEMFon=BEMFoff=BEMF (the period of the BEMF is much larger least, generally in the order of milliseconds).

The comparator of the circuit of FIG. 18B outputs (comp_OUT) the sign of the difference between the two sampled signals V_Ton-V_Toff or the sign of the difference V_Toff-V_Ton. Considering for example the first case, $$\text{comp\_OUT} = \text{sign}(V\_on - V\_Toff)$$

$$\text{comp\_OUT} = \text{sign}(BEMF + E\_ton + VCC/2 - BEF - E\_toff - VCC/2)$$

$$\text{comp\_OUT} = \text{sign}(E\_ton - E\_toff)$$

Of course, by inverting the input signals to the comparator or by inverting the S/H_cmd and Latch_cmd sequences, a signal of opposite sign equal to E_toff−E_ton, is obtained.

Using a circuit of FIG. 18A or a circuit of FIG. 18B, it is possible to nullify the effect of the BEMF and extract only the useful information of the induced voltage "E" by transformer effect without requiring onerous filtering operations. Depending on the sequence used for driving the "Sample&Hold" circuit and the latch circuit and depending on the coupling of the signals to the inputs of the comparator, a motor torque as for the first embodiment is produced.

Fourth Embodiment

BEMF Cancellation and Enhanced TORQUE

Figure 19:
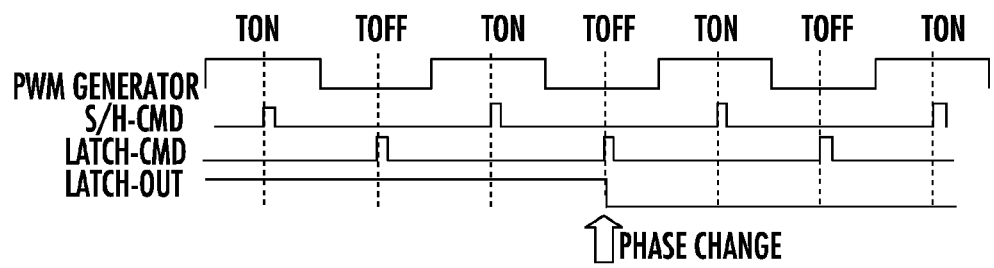
FIG. 19 is a signal diagram showing the circuit signals relative to an implementing circuit of FIG. 18A or 18B.

Similarly to what has been described in connection to the enhancement of reliability and performance obtained through the modified procedure of the second embodiment, also the procedure of the third embodiment may be enhanced by performing subsequences of phase switchings until the expected value of the sampled induced voltage E for the commanded phase drive configuration is verified. FIG. 19 depicts related electric signals of the circuit of FIG. 18B in a condition of phase change relative to the above described third embodiment in which the "Sample&Hold" circuit S/H is triggered during TON and the latch is triggered during TOFF.

Figure 21:
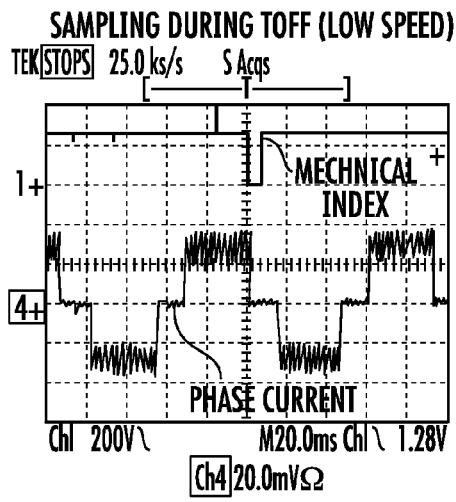
FIG. 21 is a sampling diagram showing current waveforms in a stator winding and a marker positioned on the rotor (mechanical index) at a relatively low motor speed, when driving the motor according to the first embodiment with sampling during TOFF phases of the drive signal (left side) and with sampling during TON phases of the drive signal (right side).
Figure 21:
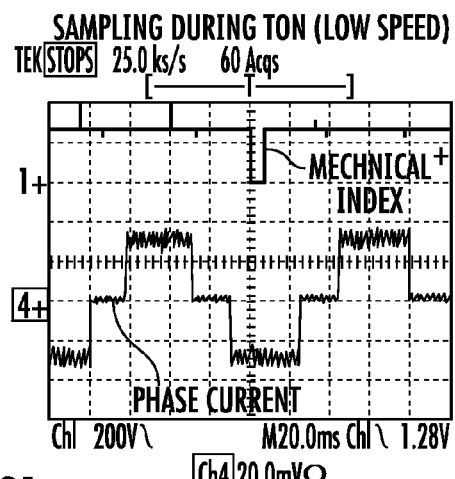

FIG. 21 (left) shows the excitation current flowing in a stator phase winding and a reference (mechanical index) positioned on the rotor in case of driving according to the first embodiment and sampling the induced voltage "E" during TOFF, and FIG. 21 (right) is a similar representation in case of sampling during TON. The current waveforms of FIG. 21 pertain to a motor being started and rotating at very low speed, thus with negligible BEMF.

As long as the BEMF remains negligible, the induced voltage "E" generated by transformer effect is the dominating addend (|E_toff|>|BEMF| and |E_ton|>|BEMF|) and thus the produced feedback signal remains practically uncorrupted by the BEMF. At these low speed conditions, sampling during TON or during TOFF gives a different modifies the result because of the phase opposition between the detected signal E_toff and E_ton, as illustrated in FIG. 21.

Upon the progressive increase of the speed of the rotor during start-up, when the rotor speed surpasses a certain threshold speed, the BEMF voltage becomes larger than the voltage induced by transformer effect (E_on or E_toff) and the information that is derived from the sampling no longer pertains to voltage induced by transformer effect, but to the BEMF generated by the rotating permanent magnet rotor. Beyond such a threshold speed the feedback signal that is derived is thus the BEMF and its phase is no longer related to whether sampling is done during TON or during TOFF phases of the drive signal.

Figure 22:
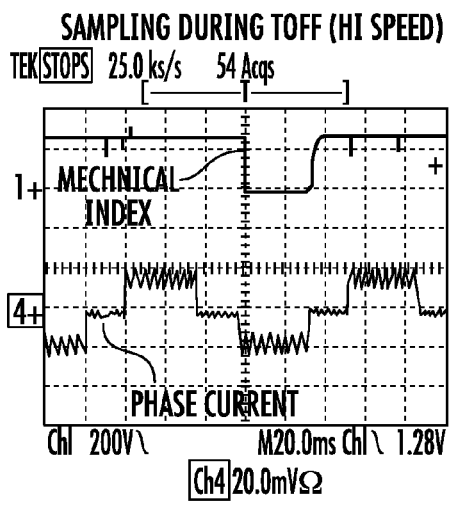
FIG. 22 is a sampling diagram showing current waveforms in a stator winding and a marker positioned on the rotor (mechanical index) at a relatively high motor speed, when driving the motor according to the first embodiment with sampling during TOFF phases of the drive signal (left side) and with sampling during TON phases of the drive signal (right side).
Figure 22:
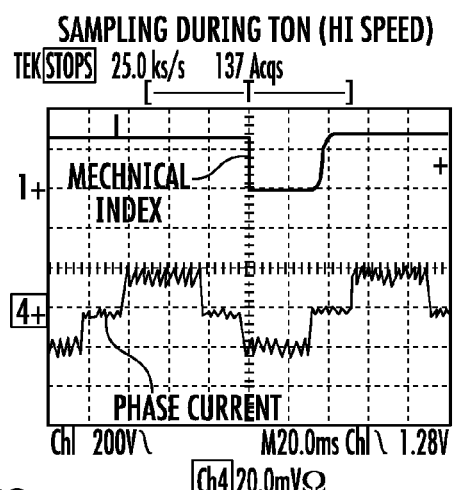

This is well illustrated in FIG. 22, showing at the left side, the excitation current waveform in case of driving according to the first embodiment and of sampling the induced voltage "E" during TOFF phases of the drive signal and at the right side, the excitation current with sampling during TON. As observable, the phase remains the same at high speed conditions.

From the above depicted examples, it is evident that the BEMF signal eventually changes the nature of the sensed induced voltage on the non-conductive winding (i.e. feedback signal). At low speeds the feedback signal is substantially the voltage induced by transformer effect and can be used for the start-up process, contrarily at high speeds the feedback signal is substantially the BEMF that can be used for synchronizing the phase switchings for normal running the motor in closed loop mode thus the motor autonomously exit the closed loop start-up process and enters the BEMF-closed-loop mode.

Embodiments Including a "Watchdog" Function

Tests showed that the rotor positions at which the changes of sign of the induced voltage "E" take place may not be exactly as indicated in FIGS. 11A and 11B because the functioning of motors is not ideal and similarly not ideal is the functioning of the circuits used for sensing the polarity of the induced voltage (e.g. offset of the comparator). Because of non idealities, the startup procedure, according to any of the above described embodiments, could theoretically fail (though very rarely) if it is not preceded by an alignment procedure of the rotor or by an identification of the initial position of the rotor, for example using the technique disclosed in U.S. Pat. No. 6,841,903.

It is possible to ensure the fullest reliability of the start-up process procedure by introducing a control, that may be defined a "watchdog" function as will be described hereinafter. Referring for example to the second embodiment with sampling of the voltage "E" during TOFF (according to the flow chart of FIG. 15), the procedure is started by arbitrarily exciting any one of the six step configurations of phase windings for a fixed time Tstep1 and successively for a time Tstep2 with the next configuration that advances by 60 electrical degrees the statoric magnetic field vector. If the expected event does not occur within a pre-established maximum time interval after starting the excitation, an increment is forced, as if the condition (E=Expected_E) had been verified. Therefore, the watchdog control may include measuring the elapsed time using a timer and activating a flag when it exceeds a maximum pre-established time, or alternatively in counting the number of excitation steps and activating the flag when the counting reaches a certain value.

The set duration of the watchdog should be longer than the maximum time expected to be needed by the rotor to move from standstill and reach a first transition point, under optimal conditions. For example, if such a minimum unavoidable delay is in the order of 50 ms, the watchdog delay time could be reasonably set in a range from about 100 ms to about 150 ms. Setting the watchdog time to a longer value could excessively delay resolution of an eventual rotor-stuck condition. A value too close to the maximum time capability of the motor, may lead to unnecessary activations of the watchdog function. By forcing switching change of the phase excitation sequence any rotor-stuck condition that could theoretically be experienced will be resolved and the rotor will be eventually accelerated in the desired direction.

Figure 23:
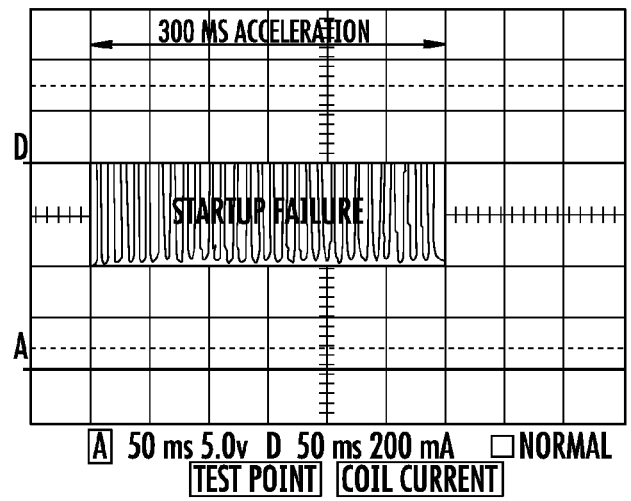
FIG. 23 is a timing diagram depicting a startup failure event (stuck rotor).

FIG. 23 shows the motor phase current and represents an example of failure in a start-up process according to second embodiment with sampling during TOFF and without implementing a watchdog function. More particularly, FIG. 23 represents a test in which a two-step sub-sequence according to the second embodiment has continued for more than 300 ms.

Figure 24:
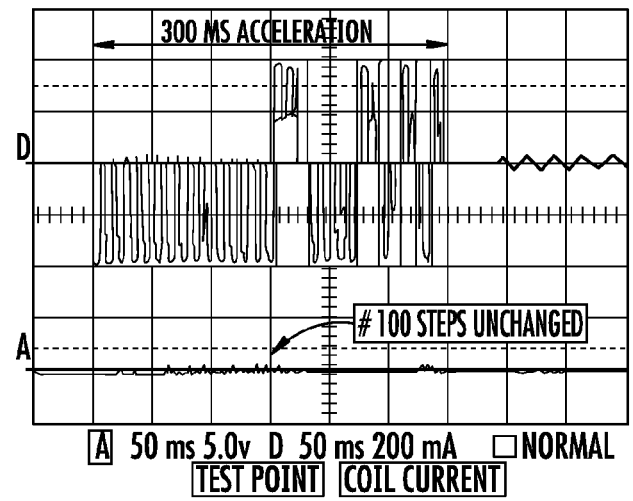
FIG. 24 is a timing diagram illustrating a modified start-up procedure using a so-called "watchdog" technique for resolving stuck rotor occurrences.
Figure 25:
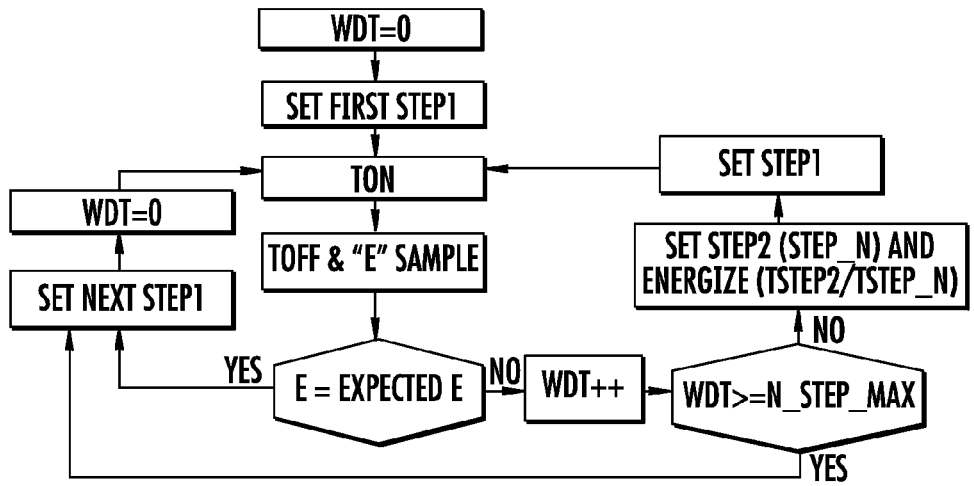
FIG. 25 is a modified flow chart including a so-called "watchdog" function.

FIG. 24 represents the startup procedure in the same initial conditions of the start-up of FIG. 23 (same initial position of the rotor and same initial excitation configuration) but with the implementation of a watchdog function. The signal "Test Point" flags the end of the maximum time interval set the watchdog. Reliability is significantly enhanced practically ensuring that any rotor-stuck condition due to an unfavourable rest position of the rotor is resolved FIG. 25 depicts a sample flow-chart including the watchdog control function, wherein the counting of steps without verifying the expected transition of the sign of the sampled induced voltage signal "E" determines the change of the drive configuration. Any other way of measuring time in absence of any transition (E=ExpectedE) may be used.

In FIG. 25 the watchdog is used in combination to the second embodiment of the present invention but it is applicable to any of the other embodiments. Each of the four basic embodiments has pros and cons and users may choose whether to choose or even combine different embodiments.

For example, to combine the advantages of the first and second embodiment, it is possible to implement the second embodiment with a sampling during TOFF phases only for the firsts steps (to increase both the average torque and reliability) and then to switch to implementing the first embodiment once the rotor has begun to rotate. The transition to the procedure of the first embodiment once the rotor has begun to rotate may reduce or eliminate risks of misses ("rotor stuck") and may avoid the constraints on maximum speed intrinsic to the procedure of the second embodiment. Implementation of the watchdog function is generally advisable.

Application to Active Braking Procedures at Sub BEMF-Detection Speeds

Notwithstanding the fact that the basic method has been described in its numerous alternative embodiments for starting up a motor, the same is also generally suitable for braking a brushless motor. Exploitation of the voltage induced by transformer effect, E_ton and E_toff allows also to more extensively control the motor during a spin-down to rest operation under closed-loop conditions.

In certain applications, such as for example for hard-disk drive, the spin-down operation is a particular condition that should last as short as possible. There are elements in every hard disk (bearings and read/write heads) that deteriorate relatively fast when rotation speed is very low. For this reason it is important to bring the rotor to rest as quickly as possible.

At very low speeds, the BEMF that is typically used for keeping the driver stage and the rotor position in synchrony, decreases proportionally to the decrease of the speed and eventually ceases to be usable when the motor speed becomes lower than a certain threshold (typically few hundreds of RPM in hard disk applications). Commonly at these very low speeds, the phase windings of the motor are shorted together for exploiting the short-circuit current as a braking current (dynamic breaking). However, the speed being small, the corresponding related BEMF is also small and therefore the short-circuit current cannot produce large decelerations.

Another method for realizing an active braking is disclosed in the U.S. Pat. No. 7,158,329. In this patent, the technique known as "inductive sensing" is used for determining the rotor position (and thus maintain the synchronism of the driver) after the speed of the motor itself has become insufficient to permit a reliable sensing of the BEMF. Synchronism of the driver circuit is retained by deliberately forcing current pulses for detecting the rotor position and obtaining a quicker deceleration. A drawback of this method is that very often the current pulses used for detecting the rotor position must be relatively large and may generate noise in the acoustic band.

A further application of the method relates to the implementation of an active braking under closed-loop conditions by exploiting the signals E_ton and/or E_toff as useful feedback signals for retaining synchronization of the driver stage as far as down to nullification of the speed. The signals E_ton and E_toff induced by transformer effect are detectable independently from the motor speed and thus they are useful for keeping synchrony of the driver stage even at speeds approaching zero. This further application of the method may be implemented by simply inverting the expected sign values (Expected_E), using the same implementing circuits described above.

Figure 26:
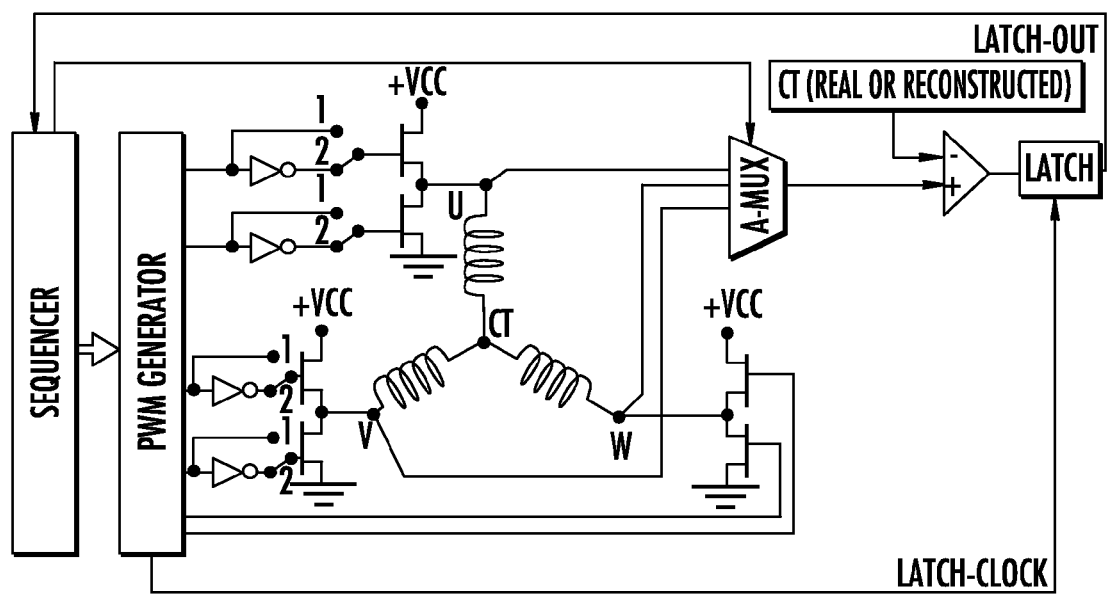
FIG. 26 is a schematic diagram illustrating a circuit suitable for a hardware realization procedure of the method of the invention.
Figure 27:
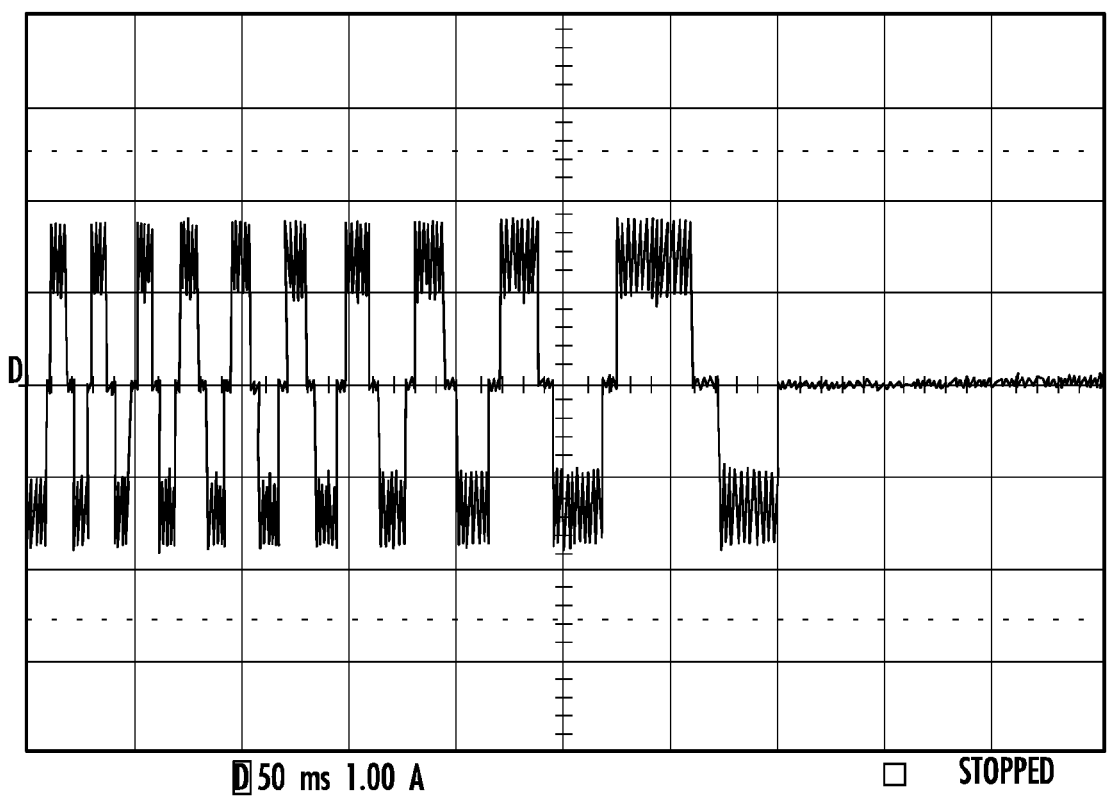
FIG. 27 is a timing diagram illustrating drive current waveforms during a "closed-loop braking operation" (active brake) implemented according to the method of the invention.

Another possible way of quickening nullification of speed is to force an inversion of the synchronized driving signal. This inversion may be obtained, for example, by connecting logic NOT gates for inverting the signals that drive the power stage, as shown in FIG. 26. The driving current is thus out-of-phase by 180 electrical degrees in respect to the current that is forced during the startup phase still keeping the magnetic field rotating in the right direction. An example of active-braking implemented according to this invention is illustrated in FIG. 27, showing that the driver stage remains synchronized with the rotor position, effectively forcing a braking current as far as arresting the rotor.

All the procedures that have been described can be implemented with an appropriate hardware or alternatively via a software executed by a computer or microprocessor.

That which is claimed is:

1. A method of synchronizing sequential phase switchings in driving stator windings of a multiphase sensorless brushless motor through a sequence of drive configurations of the stator windings, with reconstructed information on a current angular position of a magnetic rotor, the method comprising:
   sampling on a currently non-conductive stator winding a voltage induced thereon by a resultant magnetic field produced by a drive current forced through currently conductive stator windings that inverts its sign when the magnetic rotor transitions across a plurality of angular positions, at which orthogonality between the resultant magnetic field and a magnetic axis of the non-conductive winding verifies; and
   comparing the sign of the sampled voltage induced on the currently non-conductive winding with an expected sign upon reaching an angular position of inversion of the sign of the sampled voltage by the magnetic rotor for a current drive configuration, for consequentially switching to a next drive configuration of the sequence upon verifying conformity of the sign of the sampled voltage with the expected sign at the sign inversion.

2. The method of claim 1, wherein driving the stator windings includes using a PWM-type drive signal.

3. The method of claim 2, wherein the sampling is performed during OFF phases of the PWM-type drive signal.

4. The method of claim 2, wherein the sampling is performed during ON phases of the PWM-type drive signal.

5. The method of claim 1, wherein a first time interval is defined, upon expiration of which, after having initiated to drive the motor according to a selected drive configuration without having yet verified conformity of the sign of the sampled voltage with the expected sign, the drive configuration is advanced to a next drive configuration of the sequence of drive configurations and driving the stator windings is continued for at least a second defined time interval, before reverting to the selected phase configuration until the sign conformity is verified during the drive configuration of the first time interval.

6. The method of claim 2, further comprising:
   comparing the sampled voltage during ON phases and during OFF phases of the PWM-type drive signal; and
   verifying conformity of the sign of a difference voltage between the sampled voltage during an ON phase and the voltage sampled during a successive OFF phase of the PWM-type drive signal for nullifying a BEMF component of the sampled voltage.

7. The method of claim 1, wherein for each drive configuration, when conformity of the sign of the sampled voltage induced on the currently non-conductive winding with the expected sign upon reaching the angular position of inversion of the sign of the sampled voltage by the magnetic rotor for the respective drive configuration is not verified after a delay time from beginning to drive the stator windings in the respective drive configuration, the drive configuration is advanced to a next drive configuration of the sequence of the drive configurations.

8. A method of controlling a multiphase sensorless brushless motor having a rotor and a plurality of stator windings, the method comprising:
sequentially driving the plurality of stator windings according to a plurality of phase drive configurations producing a drive current in a stator winding tap and exiting another stator winding tap while placing stator windings that are not driven to a high impedance state, under closed loop control conditions; and
obtaining a feedback signal by sampling on a currently non-conductive stator winding a voltage induced thereon by a resultant magnetic field produced by the drive current in the currently conductive stator windings that inverts its sign when the rotor transitions across a plurality of angular positions, at which orthogonality between the resultant magnetic field and a magnetic axis of the non-conductive winding verifies; and
comparing the sign of the sampled voltage induced on the currently non-conductive winding with the expected sign upon reaching the angular position of inversion of the sign of the sampled voltage by the rotor for the current phase drive configuration, for consequentially switching to the next phase drive configuration of the sequence upon verifying conformity of the sign of the sampled voltage with the expected sign at the sign inversion.

9. The method of claim 8, wherein sequentially driving the plurality of stator windings comprises at least one of starting-up and braking the rotor to a stop.

10. The method of claim 8, wherein sequentially driving the plurality of stator windings includes use of a PWM-type drive signal.

11. The method of claim 10, wherein the sampling is performed during OFF phases of the PWM-type drive signal.

12. The method of claim 10, wherein the sampling is performed during ON phases of the PWM-type drive signal.

13. The method of claim 8, wherein a first time interval is defined, upon expiration of which, after having initiated to drive the motor according to a selected drive configuration without having yet verified conformity of the sign of the sampled voltage with the expected sign, the drive configuration is advanced to a next drive configuration of the sequence of drive configurations and driving the stator windings is continued for at least a second defined time interval, before reverting to the selected phase configuration until the sign conformity is verified during the drive configuration of the first time interval.

14. The method of claim 10, further comprising:
comparing the sampled voltage during ON phases and during OFF phases of the PWM-type drive signal; and
verifying conformity of the sign of a difference voltage between the sampled voltage during an ON phase and the voltage sampled during a successive OFF phase of the PWM-type drive signal for nullifying a BEMF component of the sampled voltage.

15. The method of claim 8, wherein for each drive configuration, when conformity of the sign of the sampled voltage induced on the currently non-conductive winding with the expected sign upon reaching the angular position of inversion of the sign of the sampled voltage by the magnetic rotor for the respective drive configuration is not verified after a delay time from beginning to drive the stator windings in the respective drive configuration, the drive configuration is advanced to a next drive configuration of the sequence of the drive configurations.

16. The method according to claim 10, wherein each OFF phase of the PWM-type drive signal is established by coupling to a same voltage as the taps of the stator windings driven during a preceding ON phase of the PWM-type drive signal.

17. The method according to claim 10, wherein each ON phase of the PWM-type drive signal is established by coupling the tap of a first driven stator winding to a supply voltage rail and coupling the tap of at least a second driven stator winding to a common ground node.

18. The method according to claim 10, wherein each OFF phase of the PWM-type drive signal is established by applying an inverted voltage of the preceding ON phase of the drive signal to the taps of the driven stator windings.

19. The method according to claim 10, wherein each OFF phase of the PWM-type drive signal is established by forcing the driven phase windings to the high impedance state.

20. The method according to claim 8, wherein the plurality of stator windings define star-connected stator windings, and wherein the induced voltage on the non-conductive winding is sensed between the respective tap of the non-conductive winding and a neutral-point of the star connected stator windings.

21. The method of claim 8, wherein the plurality of stator windings define star-connected stator windings having a node, and wherein the induced voltage on the non-conductive winding is sensed between the respective tap and the node at a reconstructed potential of a neutral-point of the star connected stator windings.

22. The method of claim 8, wherein the induced voltage on the non-conductive winding is sensed between the respective tap and a node of the plurality of stator windings at a fractional value of a supply voltage.

23. A device for synchronizing sequential phase switchings in driving stator windings of a multiphase sensorless brushless motor through a sequence of drive configurations of the stator windings, with reconstructed information on a current angular position of a magnetic rotor, the device comprising:
a control circuit configured to sample a voltage induced on a currently non-conductive stator winding by a resultant magnetic field produced by a drive current forced through currently conductive stator windings that inverts its sign when the magnetic rotor transitions across a plurality of angular positions, at which orthogonality between the resultant magnetic field and a magnetic axis of the non-conductive winding verifies;
wherein the control circuit is configured to compare the sign of the sampled voltage induced on the currently non-conductive winding with an expected sign upon reaching an angular position of inversion of the sign of the sampled voltage by the magnetic rotor for a current drive configuration, for consequentially switching to a next drive configuration of the sequence upon verifying conformity of the n of the sampled voltage with the expected sign at the sign inversion.

24. The device of claim 23, wherein the stator windings are driven with a PWM-type drive signal.

25. The device of claim 24, wherein the control circuit samples the induced voltage during OFF phases of the PWM-type drive signal.

26. The device of claim 24, wherein the control circuit samples the induced voltage during ON phases of the PWM-type drive signal.

* * * * *